April 4, 1944.　　　　L. D. FULTON　　　　2,346,018
OIL FILTER
Filed July 9, 1942　　　　2 Sheets-Sheet 1
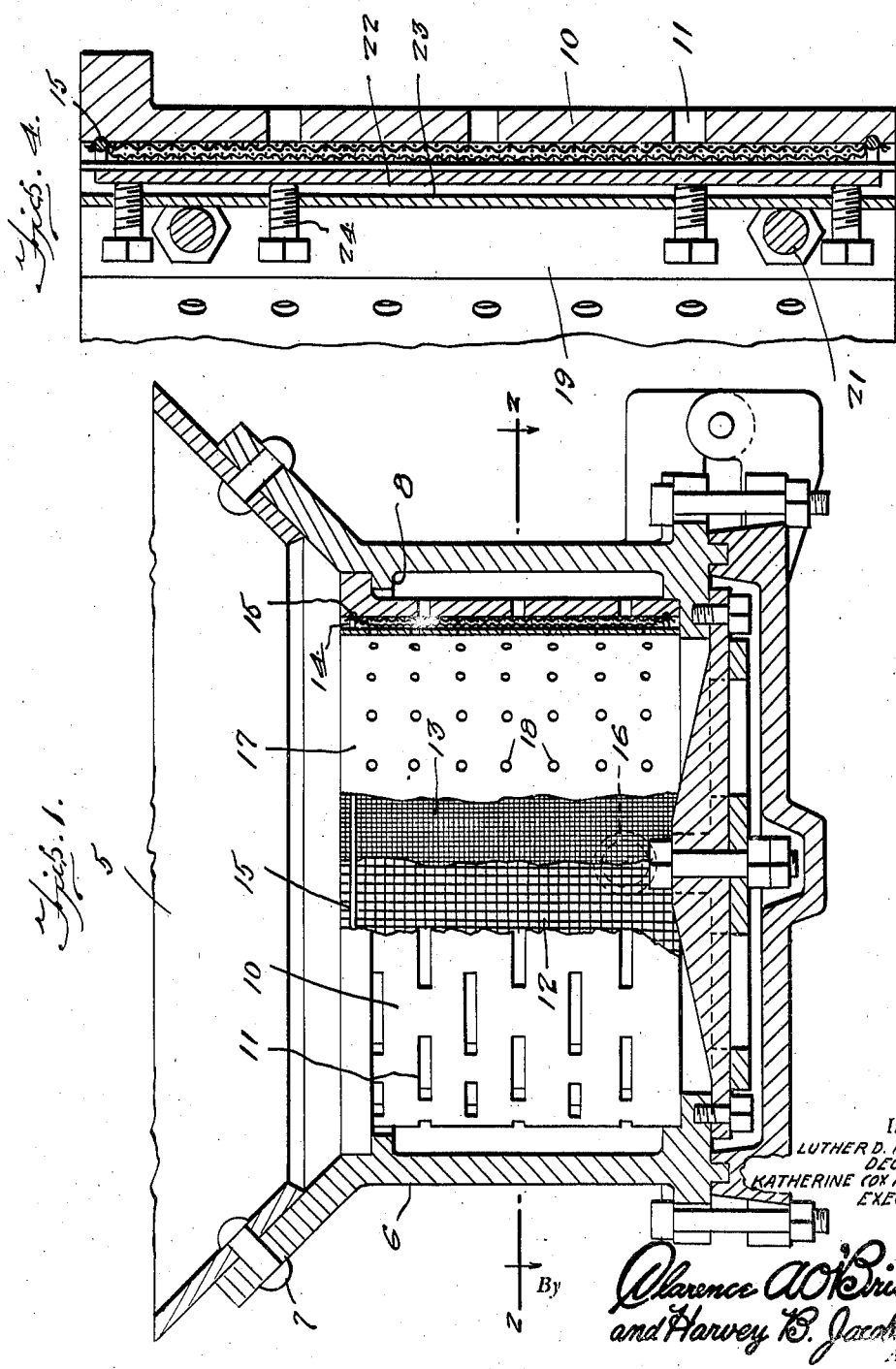
Inventor
LUTHER D. FULTON
DECEASED
KATHERINE COX FULTON,
EXECUTRIX
By Clarence A. O'Brien
and Harvey B. Jacobson
Attorneys

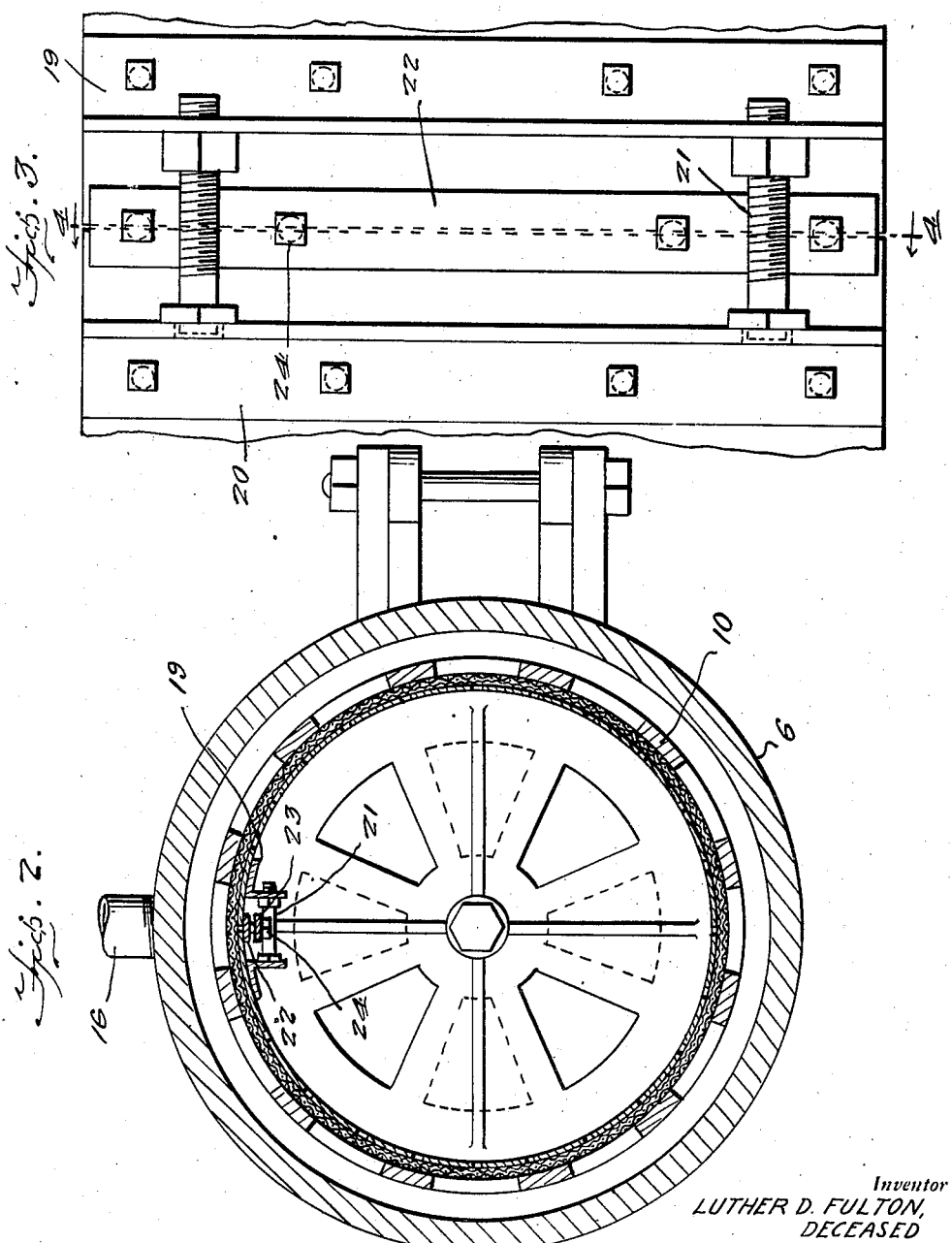

Patented Apr. 4, 1944

2,346,018

UNITED STATES PATENT OFFICE 2,346,018

OIL FILTER

Luther D. Fulton, deceased, late of Titusville, Pa., by Katherine Cox Fulton, executrix, Titusville, Pa., assignor of one-half to Hammond Iron Works, Warren, Pa., a corporation of Pennsylvania Application July 9, 1942, Serial No. 450,328

2 Claims. (Cl. 210—154)

The present invention relates to new and useful improvements in oil filters and constitutes an improvement in the filter covered by Letters Patent No. 1,547,315 dated July 28, 1925, and issued to Luther D. Fulton.

The present invention embodies the provision of a screen protection ring for the filter to prevent collapsing of the screen due to pressure exerted thereon in a reverse direction when it is desired to pump a washing fluid through the filter head in a direction opposite to the normal flow of oil through the filter for the purpose of cleaning the same.

A further object is to provide a screen protection ring for the filter of simple and practical construction, which is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 1 is a vertical sectional view.

Figure 2 is a tranverse sectional view taken substantially on a line 2—2 of Figure 1.

Figure 3 is a fragmentary view in elevation showing the connection for the split ends of the protection ring, and Figure 4 is a vertical sectional view taken substantially on the line 4—4 of Figure 3.

Referring now to the drawings in detail, the numeral 5 designates the usual filter tank for oil or the like and containing the clay, fuller's earth, or other filter medium and to which is secured the extension ring 6 by rivets or the like 7.

The extension ring 6 is formed with an internal shoulder 8 on which is seated the flange 9 of the supporting ring 10 of cylindrical form and having the slots 11 formed therein. The filtering screens 12 and 13 are positioned against the internal walls of the ring 10 and secured thereto by wire retaining rings 14 seated in grooves 15 formed in the walls of the ring 10.

The oil normally passes from the tank 5 through the screens 12 and 13 and through the openings 11 in the ring 10 and then outwardly through the pipe 16 in the side wall of the extension ring 6.

In order to prevent collapsing of the screens 12 and 13 when pressure is subjected thereto in a reverse direction, a supporting ring 17 is provided which is of longitudinally split cylindrical form and positioned against the inner surface of the screens 12 and 13, the ring 17 being perforated as shown at 18.

The inner surfaces of the ring 17, adjacent the split edges thereof, is provided with spaced flanges 19 and 20 connected by bolts 21 adapted to expand the supporting ring 17 against the screen.

Positioned in overlying relation with respect to the split edges of the ring 17 is a plate 22 inwardly of which is a second plate 23 having set screws 24 threaded therethrough for bearing against the plate 22 and forcing the same against the split edges of the ring 17. The plate 23 is backed against the bolt 21 by pressure exerted on the screws 24 in a manner as will be apparent, and as clearly shown in Figures 3 and 4 of the drawings.

It is believed the details of construction and manner of use of the device will be readily understood from the foregoing without further detailed explanation.

Having described the invention, what is claimed as new is:

1. A filter comprising a casing open at one end for receiving the material to be filtered and also having an outlet leading from the casing, means supporting a foraminous filtering member in spaced relation to the walls of the casing, a longitudinally split perforated cylinder, flanges on the cylinder adjacent the split edges of the cylinder, screw means engaging the flanges for expanding the cylinder against the inner surface of the filtering member, a cover plate overlapping the split edges of the cylinder and means engaging the screw means for retaining the cover plate in position.

2. A filter comprising a casing open at one end for receiving the material to be filtered and also having an outlet leading from the casing, means supporting a foraminous filtering member in spaced relation to the walls of the casing, a longitudinally split perforated cylinder, flanges on the cylinder adjacent the split edges of the cylinder, screw means engaging the flanges for expanding the cylinder against the inner surface of the filtering member, a cover plate overlapping the split edges of the cylinder, a locking plate, and set screws carried by the locking plate and engaging the cover plate, said locking plate being backed against the said screw means to retain said plates in position.

KATHERINE COX FULTON,
*Executrix of the Estate of
Luther D. Fulton, Deceased.*